(12) United States Patent
Feldman et al.

(10) Patent No.: US 10,812,839 B2
(45) Date of Patent: Oct. 20, 2020

(54) TECHNIQUES FOR AUTOMATED DATA RECORD GENERATION FROM LIVE PROGRAMS

(71) Applicant: Disney Enterprises, Inc., Burbank, CA (US)

(72) Inventors: Vladislav Feldman, New York, NY (US); Joseph Kenny, Floral Park, NY (US); Michael Strein, New York, NY (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 16/179,804

(22) Filed: Nov. 2, 2018

(65) Prior Publication Data

US 2020/0145702 A1    May 7, 2020

(51) Int. Cl.
| | | |
|---|---|---|
| *H04N 7/10* | (2006.01) | |
| *H04N 7/025* | (2006.01) | |
| *H04N 21/234* | (2011.01) | |
| *H04N 21/81* | (2011.01) | |
| *H04N 21/845* | (2011.01) | |
| *H04N 21/2187* | (2011.01) | |

(52) U.S. Cl.
CPC ... *H04N 21/23424* (2013.01); *H04N 21/2187* (2013.01); *H04N 21/8146* (2013.01); *H04N 21/8456* (2013.01)

(58) Field of Classification Search
None
See application file for complete search history.

(56) References Cited

U.S. PATENT DOCUMENTS

| | | | | |
|---|---|---|---|---|
| 6,681,394 | B1 * | 1/2004 | Fujita | H04N 7/165 725/32 |
| 7,222,155 | B1 * | 5/2007 | Gebhardt | H04N 7/088 709/204 |
| 9,986,267 | B2 * | 5/2018 | Yang | H04N 21/23424 |
| 2003/0093790 | A1 * | 5/2003 | Logan | G10H 1/0033 725/38 |
| 2006/0287915 | A1 * | 12/2006 | Boulet | G06Q 30/02 705/14.61 |
| 2007/0055983 | A1 * | 3/2007 | Schiller | H04N 21/23424 725/32 |

(Continued)

*Primary Examiner* — William J Kim
(74) *Attorney, Agent, or Firm* — Artegis Law Group, LLP

(57) ABSTRACT

Various embodiments of the invention disclosed herein provide techniques for automatically generating a recorded version of a live video program. A live program extraction application executing on a live program extraction system receives an automation list associated with the live video program from a traffic and automation system and an integration message associated with the live video program from an integration control system. The live program extraction application generates a first data entry that includes a timecode based on at least one of the automation list and the integration message. The live program extraction application stores the first data entry into a data record associated with the live video program. The live program extraction application transmits the data record to a broadcast system. The broadcast system automatically replaces a portion of the recorded version of the live video program based on the timecode included in the first data entry.

20 Claims, 8 Drawing Sheets

| | | 330 | 340 | 350 | 360 |
|---|---|---|---|---|---|
| 310(0) | Program Segment A | 00:00:00.00 | TBD | TBD |
| 320(0) | Commercial Pod 1 | TBD | 00:03:00.00 | TBD |
| 310(1) | Program Segment B | TBD | TBD | TBD |
| 320(2) | Commercial Pod 2 | TBD | 00:04:00.00 | TBD |
| 310(2) | Program Segment C | TBD | TBD | TBD |
| 320(2) | Commercial Pod 3 | TBD | 00:02:00.00 | TBD |

300

(56) References Cited

U.S. PATENT DOCUMENTS

| | | | |
|---|---|---|---|
| 2007/0055984 A1* | 3/2007 | Schiller | H04N 21/2221 |
| | | | 725/32 |
| 2009/0070808 A1* | 3/2009 | Jacobs | H04N 7/162 |
| | | | 725/36 |
| 2011/0314493 A1* | 12/2011 | Lemire | H04N 21/23424 |
| | | | 725/32 |
| 2012/0047542 A1* | 2/2012 | Lewis | H04N 21/44016 |
| | | | 725/97 |
| 2012/0060184 A1* | 3/2012 | Nguyen | H04H 60/00 |
| | | | 725/36 |
| 2013/0086601 A1* | 4/2013 | Adimatyam | H04N 21/23424 |
| | | | 725/1 |
| 2013/0282915 A1* | 10/2013 | Patel | H04L 65/602 |
| | | | 709/231 |
| 2014/0259051 A1* | 9/2014 | Strein | H04N 21/4305 |
| | | | 725/32 |
| 2014/0304366 A1* | 10/2014 | Fletcher | H04L 65/1066 |
| | | | 709/217 |
| 2015/0201227 A1* | 7/2015 | Krasko | H04N 21/2668 |
| | | | 725/34 |
| 2017/0118495 A1* | 4/2017 | Yang | H04N 21/23424 |
| 2019/0246158 A1* | 8/2019 | Martell | H04N 21/23424 |

* cited by examiner

| | | 400 |
|---|---|---|
| | 430 | 440 |
| 410(0) | Program Segment A | 00:00:00.00 |
| 420(0) | Commercial Pod 1 | 00:13:00.00 |
| 410(1) | Program Segment B | 00:16:00.00 |
| 420(2) | Commercial Pod 2 | 00:33:00.00 |
| 410(2) | Program Segment C | 00:35:00.00 |
| 420(2) | Commercial Pod 3 | 00:45:00.00 |

FIG. 4

TECHNIQUES FOR AUTOMATED DATA RECORD GENERATION FROM LIVE PROGRAMS

BACKGROUND OF THE INVENTION

Field of the Invention

The present invention relates generally to live video production and, more specifically, to techniques for automated data record generation from live programs.

Description of the Related Art

Live programs can include any form of audio and video content that is broadcast while the live events captured by that audio and video content are occurring. Typical events that are broadcast live can include, without limitation, sports competitions, morning variety shows, talent shows, awards programs, and live concerts. Live programs can also be recorded for later broadcasts, such as for time zone delay, video-on-demand (VOD), and other applications where recorded live program are subject to repeated or future airings. Live programs are typically presented as a series of program segments and groups of commercial advertisements. Such groups of commercial advertisements are referred to herein as "commercial pods."

Each program segment includes a portion of the live program. Typically, the first program segment begins at a known time, such as the top of the hour. By contrast, the end of the first program segment is typically unknown and can occur at any time. For example, the end of the first program segment could occur when a football team achieves a first down, when a live interview completes, or when the network calls for a commercial break. At the end of the first program segment, the first commercial pod plays. Typically, the duration of each commercial pod is known. For example, a commercial pod that includes six 30-second commercials has a known duration of three minutes. After the commercial pod completes, the second program segment begins. The live program continues in this fashion as a series of program segments of unknown duration and interleaved commercial pods of known duration. In addition, certain events related to the live program can cause a commercial pod to be cut short. For example, if play resumes unexpectedly early during a sports competition or breaking news occurs during a morning variety show, the commercial pod could end prematurely, where only the first four 30-second commercials of a commercial pod with a three-minute target duration are aired.

During subsequent repeated and future airings of a previously-recorded live program, one or more commercials included in the commercial pods played during the live program can be replaced with different commercials. One technique for replacing commercials is referred to herein as "dynamic ad insertion" (DAI). With DAI, a server replaces certain commercials or groups of commercials with other commercials having the same duration. In addition, DAI can be used to increase or decrease the commercial pod durations during the subsequent airings of the live program, thereby providing flexibility in the total duration of the subsequent airings of the live program. This technique for increasing or decreasing the commercial pod durations, and thereby changing the overall duration of subsequent airings of a live program, is referred to herein as "rubber-banding."

One drawback to DAI and rubber-banding is that, because the duration of the program segments and commercial pods is either not known or may vary from the target duration, simple automated replacement of the commercial pods may be difficult. In particular, an automated DAI system requires extremely accurate information about the start time of each commercial pod (referred to herein as the "hit time") and the duration of each commercial pod in order to cleanly replace commercials in a subsequent airing of a live program. Without accurate information, a DAI system may start a commercial pod early, resulting in the immediately prior program segment being cut short, or the DAI system may start a program segment early, resulting in the immediately prior commercial pod being cut short. This occurrence is referred to herein as an "up-cut" and can result in an unsatisfactory user experience. In addition, program segments can be replaced or edited for subsequent airings of a live program to resolve broadcast standards and practices (BS&P) issues, fix production mistakes, or provide updates to late breaking news. Editing and replacement of program segments results in additional uncertainty of the hit times, thereby further increasing the possibility of undesirable up-cuts.

One potential solution to the above problems is to edit the recording of the live program in an editing room and/or a post-production room after the live program or a section of the live program is complete. With such an approach, members of an editing team and/or post-production team edit program segments, as needed, and manually replace program segments and commercial pods in a recorded version of the live program for subsequent airings. One drawback to this approach is that manual post-production and editing is expensive and typically requires a room with the appropriate equipment and a specialized team to perform the editing and post-production work. Further, manually editing and replacing program segments and commercial pods can be time-consuming, resulting in delay between the original airing of the live program and the subsequent airings of the recorded live program.

As the foregoing illustrates, what is needed in the art are more effective techniques for replacing program segments and commercial pods in recorded versions of live programs for future airing.

SUMMARY OF THE INVENTION

Various embodiments of the present application set forth a computer-implemented method for automatically generating a recorded version of a live video program. The method includes receiving an automation list associated with the live video program from a traffic and automation system. The method further includes receiving an integration message associated with the live video program from an integration control system. The method further includes generating a first data entry that includes a timecode based on at least one of the automation list and the integration message. The method further includes storing the first data entry into a data record associated with the live video program. The method further includes transmitting the data record to a broadcast system. The broadcast system automatically replaces a portion of the recorded version of the live video program based on the timecode included in the first data entry.

Other embodiments of the present invention include, without limitation, a computer-readable medium including instructions for performing one or more aspects of the disclosed techniques, as well as a computing device for performing one or more aspects of the disclosed techniques.

At least one technical advantage of the disclosed techniques relative to the prior art is that a frame-accurate data record of the start times, durations, and stop times for program segments and commercial pods are recorded concurrently while a live program is aired. Consequently, the data record is available immediately after a live program completes, which allows a DAI system to receive the data record and automatically make frame-accurate substitutions of commercial advertisements in a recorded version of the live program for subsequent airing. As a result, the likelihood of causing up-cuts in subsequent airings of the live program can be substantially reduced relative to prior approaches, thereby improving the overall user experience. Another technical advantage of the disclosed techniques is that manual processes for replacing program segments and commercial pods, after the live program or a section of the live program is complete, are avoided. As a result, latency between the original and subsequent airings of a live program is reduced. Further, additional costs associated with manual editing and post-production are reduced or eliminated. These technical advantages represent one or more technological improvements over prior art approaches.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 4 illustrates exemplar messages that can be generated by the integrated control system of FIG. 1, according to various embodiments of the present invention;

DETAILED DESCRIPTION

In the following description, numerous specific details are set forth to provide a more thorough understanding of the present invention. However, it will be apparent to one of skill in the art that embodiments of the present invention may be practiced without one or more of these specific details.

System Overview

Figure 1:
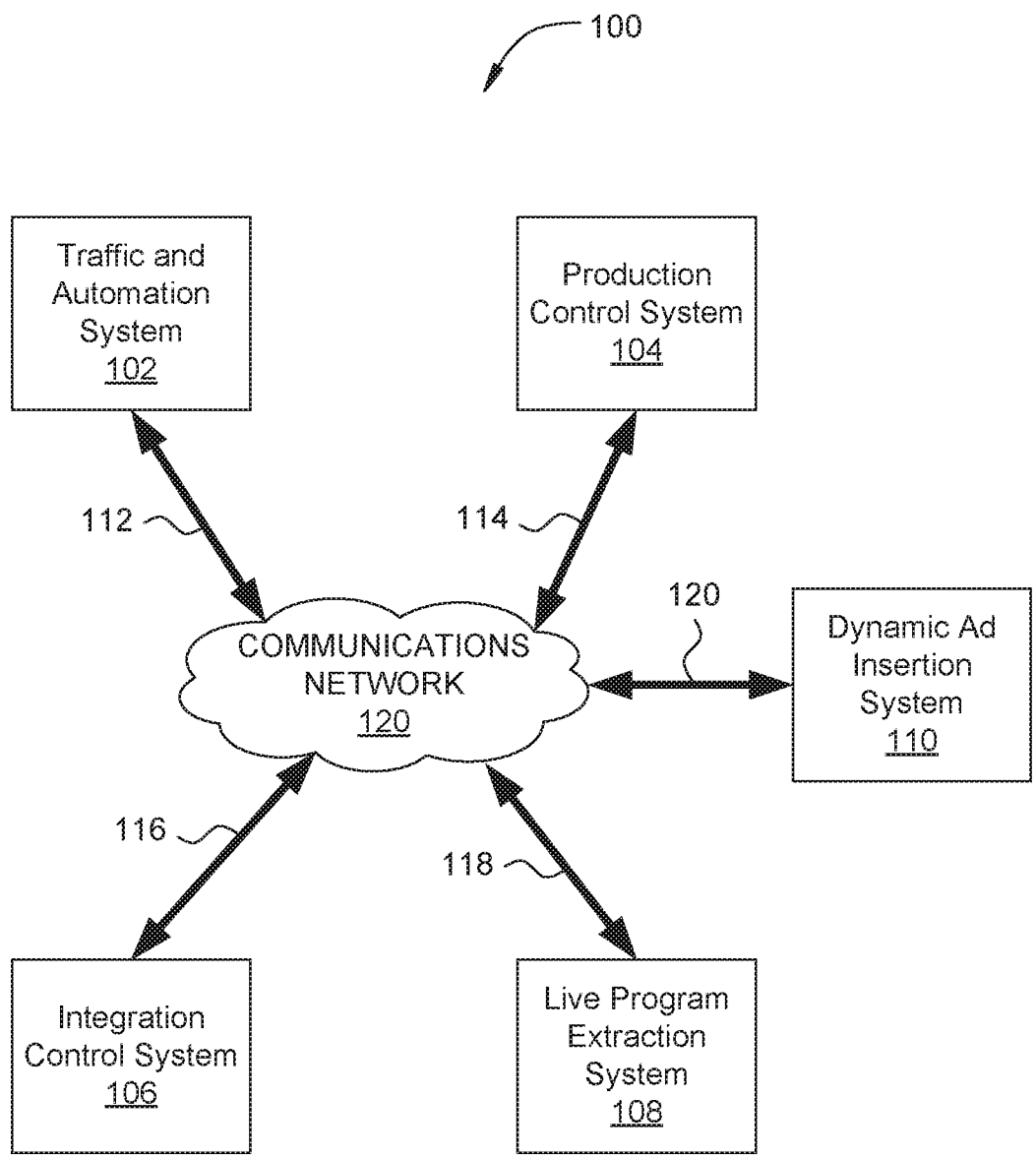
FIG. 1 illustrates a system configured to implement one or more aspects of the present invention.

FIG. 1 illustrates a system 100 configured to implement one or more aspects of the present invention. As shown, the system includes, without limitation, a traffic and automation system 102, a production control system 104, an integration control system 106, a live program extraction system 108, and a dynamic ad insertion (DAI) system 110, in communication with each other via a communications network 120. Communications network 120 may be any suitable environment to enable communications among remote or local computer systems and computing devices, including, without limitation, wireless and wired LANs (Local Area Networks) and internet-based WANs (Wide Area Networks). Additionally or alternatively, traffic and automation system 102, production control system 104, integration control system 106, live program extraction system 108, and DAI system 110 communicate with each other over one or more point-to-point communications links (not explicitly shown). Typically, traffic and automation system 102, production control system 104, integration control system 106, live program extraction system 108, and DAI system 110, or any technically feasible subset thereof, are synchronized such that the synchronized systems are video frame-accurate with respect to each other.

Traffic and automation system 102 includes, without limitation, a computing device that may be a standalone server, a cluster or "farm" of servers, one or more network appliances, or any other device suitable for implementing one or more aspects of the present invention. Illustratively, traffic and automation system 102 communicates over communications network 120 via communications link 112.

As further described herein, traffic and automation system 102 includes the inventory of commercial advertisements that have been sold for a particular live program. Traffic and automation system 102 also includes a data record of the approximate air times for each of the commercial pods to be played during the live program. As further described herein, each commercial pod may include any one or more interstitial content items, including, without limitation, individual commercials, promotional videos, and public service announcements, in any technically feasible combination. Based on the inventory of commercial advertisements and the data record of approximate air times for the commercial pods, traffic and automation system 102 generates an automation list that includes a real-time sequence of events for production control system 104 and integration control system 106. The automation list identifies a sequence of program segments and commercial pods to be aired during the live program, along with auxiliary program elements, including, without limitation, "sponsored by" graphics, also referred to herein as billboards, as well as promotional graphics and identity graphics.

Production control system 104 includes, without limitation, a computing device that may be a standalone server, a cluster or "farm" of servers, one or more network appliances, or any other device suitable for implementing one or more aspects of the present invention. Illustratively, production control system 104 communicates over communications network 120 via communications link 114.

As further described herein, production control system 104 generates the program segments for a live program. Each program segment typically includes various visual elements, such as action shots, interviews, graphics, field reports, and so on. The end of a current program segment may occur for various reasons, including, without limitation, a first down in a football game, completion of a live interview, or a planned a commercial break. At the end of the current program segment, an operator of production control system 104 communicates with an operator of integration control system 106 to coordinate switching from broadcasting the program segment to broadcasting a commercial pod. Similarly, at the end of the commercial pod, the operator of production control system 104 communicates with the operator of integration control system 106 to coordinate switching from broadcasting the commercial pod to broadcasting the next program segment.

Integration control system 106 includes, without limitation, a computing device that may be a standalone server, a cluster or "farm" of servers, one or more network appliances, or any other device suitable for implementing one or more aspects of the present invention. Illustratively, integration control system 106 communicates over communications network 120 via communications link 116.

As further described herein, integration control system 106 switches between broadcasting program segments and commercial pods. Integration control system 106 also coordinates airing of billboards, promotional graphics, and identity graphics. During a program segment, integration control system 106 broadcasts a video feed from production control system 104. At the end of a program segment, integration control system 106 switches from broadcasting a video feed from production control system 104 to broadcasting a video feed from traffic and automation system 102. Further, integration control system 106 transmits a message or other signal to traffic and automation system 102 to start playback of the appropriate commercial pod. At the end of the commercial pod, integration control system 106 transmits a message or other signal to traffic and automation system 102 to stop playback of the appropriate commercial pod. Then, integration control system 106 switches from broadcasting a video feed from traffic and automation system 102 to broadcasting a video feed from production control system 104, and the next program segment. The messages or other signals to switch from one video feed to another video feed and to start or stop playback of a commercial pod may be in any technically feasible format, including, without limitation, general purpose interface (GPI) switch closures, messages embedded within a video signal or other communications signal, and messages sent over communications network 120. In some embodiments, the messages embedded within a video signal and/or the messages sent over communications network 120 may conform to the Society of Cable and Television Engineers (SCTE) messaging standard.

Live program extraction system 108 includes, without limitation, a computing device that may be a standalone server, a cluster or "farm" of servers, one or more network appliances, or any other device suitable for implementing one or more aspects of the present invention. Illustratively, live program extraction system 108 communicates over communications network 120 via communications link 118.

As further described herein, live program extraction system 108 automatically generates a data record that includes frame-accurate records of the start times, durations, and stop times for each program segment and commercial pod as a live program is being aired. Live program extraction system 108 combines information from the automation list for the live program along with program segment and commercial pod start/stop triggers that are inserted by integration control system 106 as the live program occurs. From the automation list and the start/stop triggers, live program extraction system 108 generates the frame-accurate data record. The data record is stored in any technically feasible format, including, without limitation, metadata, an eXtended Markup Language (XML) script, an automation list, a database, a relational database, a spreadsheet, a comma-separated-value (CSV) file, and a simple text file. The frame-accurate data record is available for use in subsequent airings of the previously-recorded live program.

DAI system 110 includes, without limitation, a computing device that may be a standalone server, a cluster or "farm" of servers, one or more network appliances, or any other device suitable for implementing one or more aspects of the present invention. Illustratively, DAI system 110 communicates over communications network 120 via communications link 120.

As further described herein, DAI system 110 receives frame-accurate data records from live program extraction system 108. The data record is stored in any technically feasible format, including, without limitation, metadata, an XML script, an automation list, a database, a relational database, a spreadsheet, a CSV file, and a simple text file. Each frame-accurate data record includes start times, durations, and stop times for program segments, commercial pods, and auxiliary program elements of a live program. DAI system 110 generates a subsequent airing of the previously-recorded live program. During the subsequent airing, DAI system 110 may replace any one or more of the program segments, commercials included in the commercial pods, and auxiliary program elements based on the data entries in the frame-accurate data record.

It will be appreciated that the system shown herein is illustrative and that variations and modifications are possible. In one example, although the system 100 of FIG. 1 is illustrated with one traffic and automation system 102, one production control system 104, one integration control system 106, and one live program extraction system 108, the system 100 could include any technically feasible number of traffic and automation systems 102, production control systems 104, integration control systems 106, and live program extraction systems 108 within the scope of the present disclosure. In another example, the live program data record is described as being stored on live program extraction system 108. However, the live program data record could be stored on any technically feasible computing device or storage device that is in communication with communications network 120. In yet another example, system 100 includes a DAI system 108 that replaces one or more of the program segments, commercials included in the commercial pods, and auxiliary program elements based on the data entries in the frame-accurate data record received from live program extraction system 108. Additionally or alternatively, any other broadcast systems may perform such program element replacements based on these data entries, including, without limitation, compilation systems, editing systems, and reordering systems, in any technically feasible combination.

Various techniques for automated data record generation from live programs are now described in further detail.

Automated Data Record Generation from Live Programs

As further described herein, system 100 provides a mechanism for automated data record generation from live programs. Via system 100, live program extraction system 108 automatically generates a data record that includes frame-accurate data entries of the start times, durations, and stop times for each program segment and commercial pod as a live program is being aired. Live program extraction system 108 combines information from the automation list for the live program along with program segment and commercial pod start/stop triggers that are inserted by integration control system 106 as the live program occurs.

From the automation list and the start/stop triggers, live program extraction system 108 generates the frame-accurate data record. Various aspects of live program extraction system 108 are now described in further detail.

Figure 2:
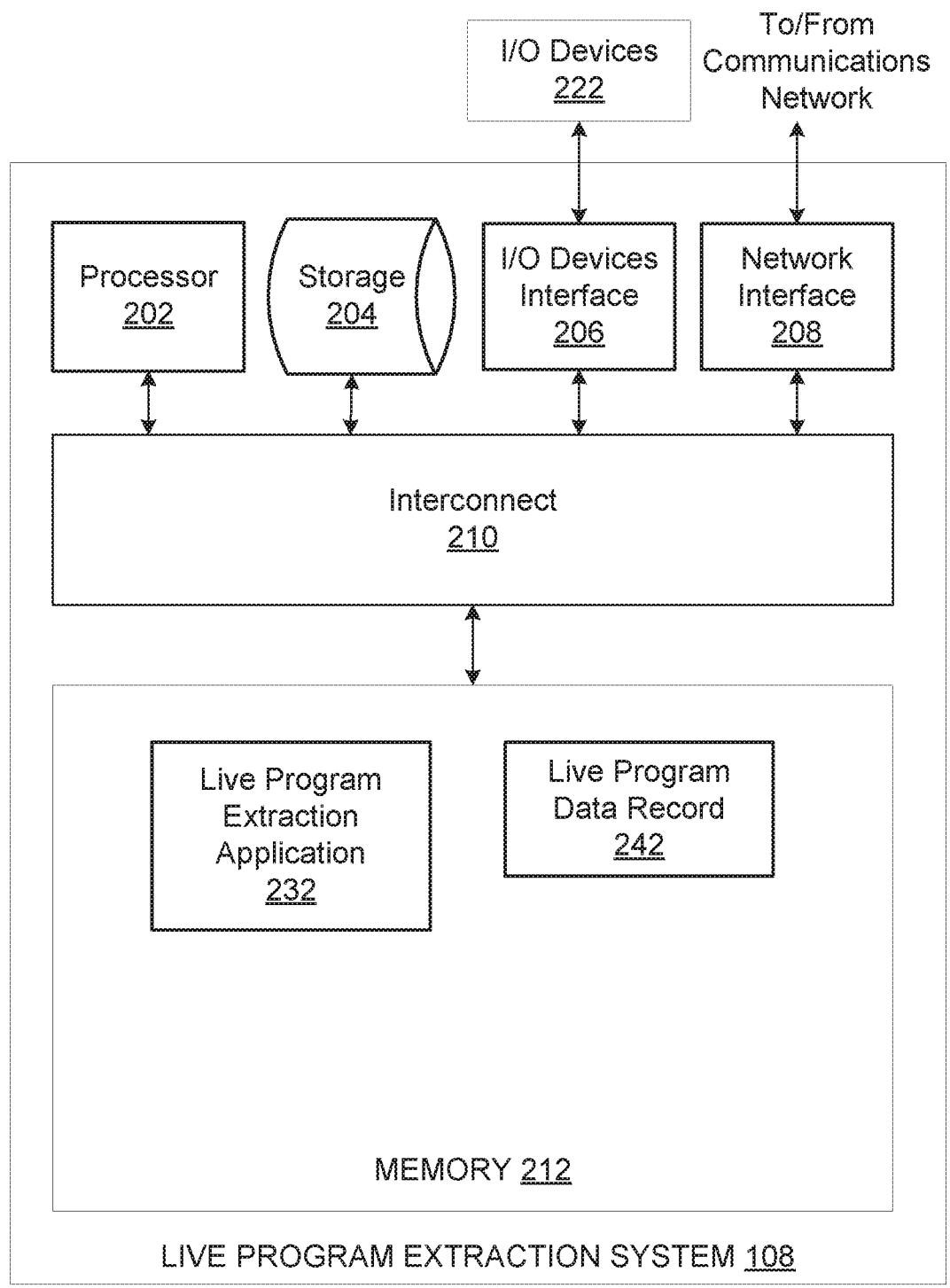
FIG. 2 is a more detailed illustration of the live program extraction system of FIG. 1, according to various embodiments of the present invention.

FIG. 2 is a more detailed illustration of the live program extraction system 108 of FIG. 1, according to various embodiments of the present invention. As shown, live program extraction system 108 includes, without limitation, a processor 202, storage 204, an input/output (I/O) devices interface 206, a network interface 208, an interconnect 210, and a system memory 212.

The processor 202 retrieves and executes programming instructions stored in the system memory 212. Similarly, the processor 202 stores and retrieves application data residing in the system memory 212. The interconnect 210 facilitates transmission, such as of programming instructions and application data, between the processor 202, input/output (I/O) devices interface 206, storage 204, network interface 208, and system memory 212. The I/O devices interface 206 is configured to receive input data from user I/O devices 222. Examples of user I/O devices 222 may include one of more buttons, a keyboard, and a mouse or other pointing device. The I/O devices interface 206 may also include an audio output unit configured to generate an electrical audio output signal, and user I/O devices 222 may further include a speaker configured to generate an acoustic output in response to the electrical audio output signal. Another example of a user I/O device 222 is a display device that generally represents any technically feasible means for generating an image for display. For example, the display device could be a liquid crystal display (LCD) display, CRT display, or DLP display. The display device may be a TV that includes a broadcast or cable tuner for receiving digital or analog television signals. The display device may be included in a VR/AR headset. Further, the display device may project an image onto one or more surfaces, such as walls or projection screens.

Processor 202 is included to be representative of a single central processing unit (CPU), multiple CPUs, a single CPU having multiple processing cores, and the like. And the system memory 212 is generally included to be representative of a random access memory. The storage 204 may be a disk drive storage device. Although shown as a single unit, the storage 204 may be a combination of fixed and/or removable storage devices, such as fixed disc drives, floppy disc drives, tape drives, removable memory cards, or optical storage, network attached storage (NAS), or a storage area-network (SAN). Processor 202 communicates to other computing devices and systems via network interface 208, where network interface 208 is configured to transmit and receive data via a communications network.

The system memory 212 includes, without limitation, a live program extraction application 232 and a live program data record 242. The live program extraction application 232, when executed by the processor 202, performs one or more operations associated with the live program extraction system 108 of FIG. 1, as further described herein.

In operation, live program extraction application 232 automatically generates a data record that includes frame-accurate data entries representing the start times, durations, and stop times for each program segment and commercial pod as a live program is being aired. Prior to the start of the live program, live program extraction application 232 receives an automation list for the live program from traffic and automation system 102. Live program extraction application 232 combines information from the automation list for the live program along with program segment and commercial pod start/stop triggers that are inserted by integration control system 106 as the live program occurs. From the automation list and the start/stop triggers, live program extraction application 232 generates the frame-accurate data record. At a minimum, live program extraction application 232 receives information that identifies the start time of each program segment and the start time of each commercial pod. From this information, live program extraction application 232 calculates durations and stop times for each program segment and each commercial pod. As further described herein, live program extraction application 232 may receive additional information from traffic and automation system 102 and integration control system 106. Live program extraction application 232 stores the frame-accurate data record in live program data record 242 in any technically feasible format, including, without limitation, metadata, an XML script, an automation list, a database, a relational database, a spreadsheet, a CSV file, and a simple text file. The frame-accurate data record is the available for use in subsequent airings of the previously-recorded live program.

Based on the automation list, live program extraction application 232 determines the target times for the start time, duration, and stop time of each program segment and commercial pod associated with the live program. The actual start times, durations, and stop times of the program segments and commercial pods typically vary in practice due to the nature of live programs. As the live program proceeds, live program extraction application 232 detects the actual start times, durations, and stop times of each program segment and commercial pod based on signals received from integration control system 106. The signals that live program extraction application 232 receives from integration control system 106 may be in any technically feasible format, including, without limitation, general purpose interface (GPI) switch closures, metadata embedded within a video signal or other communications signal, and messages sent over communications network 120.

A first type of signal from integration control system 106 indicates when integration control system 106 switches from broadcasting a video feed from production control system 104 to broadcasting a video feed from traffic and automation system 102. A second type of signal from integration control system 106 indicates when integration control system 106 switches from broadcasting a video feed from traffic and automation system 102 to broadcasting a video feed from production control system 104. A third and fourth type of signal from integration control system 106 indicate when integration control system 106 transmits a message or other signal to traffic and automation system 102 to start play or stop play of a commercial pod, respectively. From these signals, live program extraction application 232 calculates the start time, duration, and stop time of each program segment. Similarly, live program extraction application 232 calculates the start time, duration, and stop time of each commercial pod. In general, the stop time of a program segment is identical with the start time of the immediately subsequent commercial pod. Likewise, the stop time of a commercial pod is identical with the start time of the immediately subsequent program segment.

In this manner, live program extraction application 232 converts the target times present in the automation list into actual times as the live program progresses, where the actual times are determined by integrated control system 104. More specifically, live program extraction application 232 generates time-stamped data entries representing frame-accurate start times, durations, and stop times, and stores the time-stamped data entries as a data record in live program data record 242.

Each program segment and commercial pod start time, duration, and stop time is entered into this data record. Upon completion of the live program, the data record is repurposed as a frame-accurate automation list that a DAI system or can employ to automatically generate a subsequent airing of the previously-recorded live program, while substituting individual program segments or commercial pods as desired. Because the DAI system has frame-accurate knowledge of the start time, duration, and stop time of each program segment or commercial pod can substitute program segments and commercial pods while avoiding undesirable up-cuts.

In some embodiments, live program extraction application 232 may generate multiple data records, where each data record corresponds to a different section of the live program. By generating a different data record for each section, live program extraction application 232 accommodates a live program with an expected duration that is longer than the delay between the start of the live program and the start of the subsequent airing.

In one example, a live program could be scheduled to last approximately three hours, while the subsequent airing of the recorded live program could be delayed by one hour to accommodate a different time zone. In this example, live program extraction application 232 would generate a different data record for each section. Each section could correspond to multiple program segments and commercial pods over a time period that is less than or equal to the delay between the live program and the subsequent airing of the recorded live program.

At the start of the live program, live program extraction application 232 would compute actual start times, durations, and stop times for program segments and commercial pods. Live program extraction application 232 would store the computed times and durations in a first data record for a first section with a duration that is less than or equal to one hour. After the first section is complete, live program extraction application 232 would complete the first data record corresponding to the first section and transmit the first data record to a DAI system to begin the subsequent airing of the recorded first section. Then, live program extraction application 232 would continue to compute actual start times, durations, and stop times and store the times and durations in a second data record for a second section. Concurrently, the DAI system would air the first section, substituting program segments and commercial pods as needed.

Before the DAI system completes the first section, live program extraction application 232 would complete the second data record corresponding to the second section and transmit the second data record to the DAI system to begin the subsequent airing of the recorded second section. Then, live program extraction application 232 would continue to compute actual start times, durations, and stop times for a third section while the DAI system airs the second section. Live program extraction application 232 and the DAI system would continue to operate in this manner until the live program is complete.

In some embodiments, live program extraction application 232 may accommodate late breaking news that develops during the live program. Live program extraction application 232 may generate multiple data records to accommodate airing a four-hour long live program along with three subsequent airings to accommodate a total of four time zones. The live broadcast may include a program segment that involves a hostage situation that is developing in a major city. Live program extraction application 232 may transmit a data record that includes the start time, duration, and stop time for the program segment that includes a story about the hostage situation. During the airing of the subsequent airing delayed by one hour, the DAI system may seamlessly replace the program segment with an updated program segment covering the police officers that have arrived at the scene. During the airing of the subsequent airing delayed by two hours, the DAI system may seamlessly replace the program segment with another updated program segment covering ongoing hostage negations with the kidnapper. During the airing of the subsequent airing delayed by three hours, the DAI system may seamlessly replace the program segment with yet another updated program segment with news that the release of the hostages are released and that the kidnapper is in custody. In this manner, live program extraction application 232 generates data records that accommodate replacement of program segments as well as commercial pods.

In some embodiments, live program extraction application 232 may accommodate rubber-banding where the duration of commercial pods and/or the entire previously-recorded live program may be changed for subsequent airings. The length of commercial pods may be increased in order to sell more commercial advertisements for a subsequent VOD airing of the previously-recorded live program, thereby increasing the duration of the subsequent airing. Additionally or alternatively, the length of commercial pods may be decreased for a subsequent VOD airing of the previously-recorded live program, thereby decreasing the duration of the subsequent airing. Additionally or alternatively, the length of earlier commercial pods may be decreased while the length of later commercial pods may be increased, to keep the same program duration while maintaining viewer interest during the early portion of the subsequent airing.

In some embodiments, live program extraction application 232 may record start times, durations, and stop times for other elements of the live program in addition to program segments and commercial pods. Specifically, live program extraction application 232 may record start times, durations, and stop times for various elements, including, without limitation, billboards, promotional graphics, and identity graphics. In general, billboards include static graphics and/or animations that identify a commercial sponsor of the live program. Promotional graphics include static graphics and/or animations that inform the viewer of upcoming programs. Identity graphics include static graphics and/or animations that identify a presenter or provider of a live program, including, without limitation, a broadcast network, a local broadcast affiliate, a presentation organization, or other entity. Live program extraction application 232 may generate a data record that includes start times, durations, and stop times for any one or more of these billboards, promotional graphics, and identity graphics. As a result, the DAI system may replace any of the billboards, promotional graphics, and identity graphics for subsequent airings of the previously-recorded live program.

In some embodiments, the automation list received from traffic and automation system 102 and/or the messages received from integration control system 106 may include start times, durations, and stop times for each interstitial content item, including, without limitation, individual commercial advertisements, promotional videos, and public service announcements. In such embodiments, live program extraction application 232 may record start times, durations, and stop times for each individual interstitial content item within a commercial pod. In this manner, the DAI system may replace individual interstitial content items within commercial pods or entire commercial pods, in any technically feasible combination.

Figure 3:
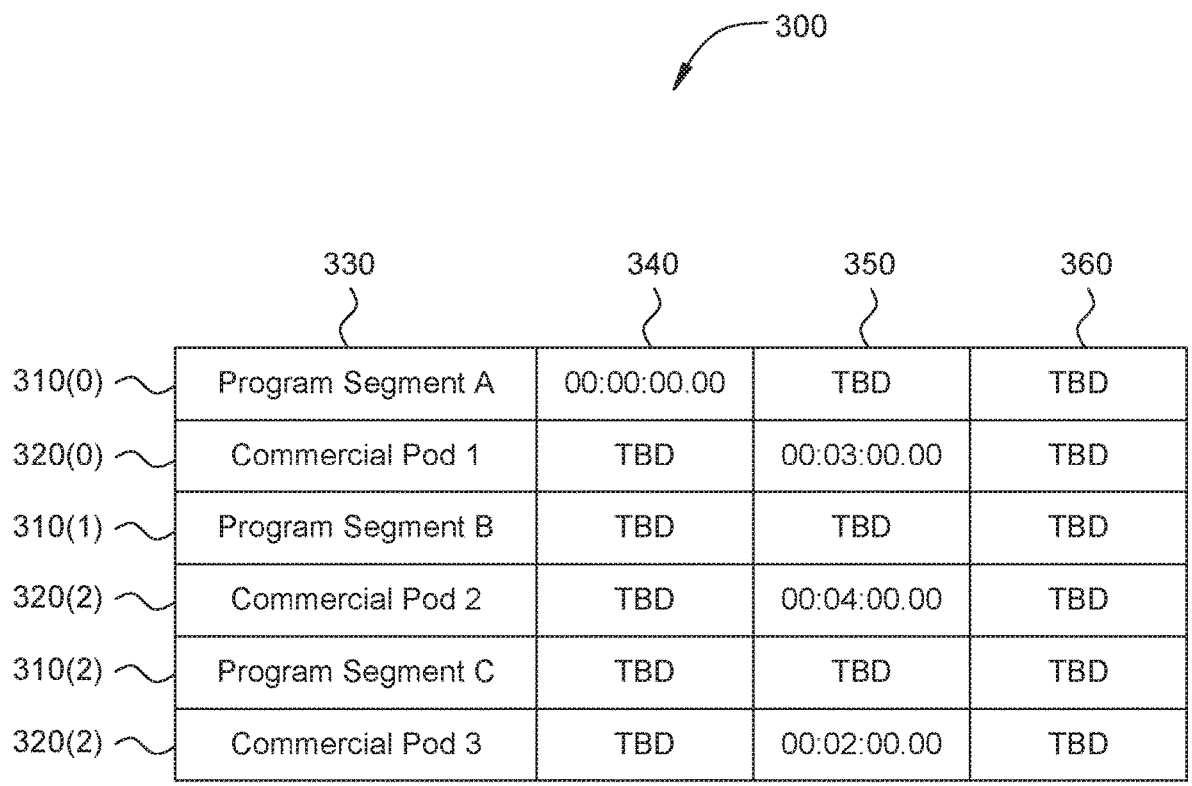
FIG. 3 illustrates an exemplar automation list that can be generated by the traffic and automation system of FIG. 1, according to various embodiments of the present invention.

FIG. 3 illustrates an exemplar automation list 300 that can be generated by the traffic and automation system 102 of FIG. 1, according to various embodiments of the present invention. As shown in FIG. 3, the automation list 300 includes program segments 310(0)-310(2) and commercial pods 320(0)-320(2). Program segment 310(0) has a name 330 of "Program Segment A." Because program segment 310(0) is the first segment in the live program, the start time 340 is known. In particular, the start time 340 of program segment 310(0) is 00:00:00.00, where the timecode format is <hours>:<minutes>:<seconds>.<frames>. The duration 350 and stop time 360 of program segment 310(0) are shown as TBD because the values are unknown. Commercial pod 320(0) has a name 330 of "Commercial Pod 1." Only the duration 350 of commercial pod 320(0) is known in advance. Consequently, the duration 350 of commercial pod 320(0) is shown as 00:03:00.00 (3 minutes), while the start time 330 and the stop time 360 are TBD.

Program segment 310(1) has a name 330 of "Program Segment B." The start time 340, duration 350, and stop time 360 of program segment 310(0) are shown as TBD because the values are unknown. Commercial pod 320(0) has a name 330 of "Commercial Pod 2." Only the duration 350 of commercial pod 320(0) is known in advance. Consequently, the duration 350 of commercial pod 320(0) is shown as 00:04:00.00 (2 minutes), while the start time 330 and the stop time 360 are TBD.

Program segment 310(1) has a name 330 of "Program Segment B." The start time 340, duration 350, and stop time 360 of program segment 310(1) are shown as TBD because the values are unknown. Commercial pod 320(1) has a name 330 of "Commercial Pod 2." Only the duration 350 of commercial pod 320(1) is known in advance. Consequently, the duration 350 of commercial pod 320(1) is shown as 00:04:00.00 (4 minutes), while the start time 330 and the stop time 360 are TBD.

Program segment 310(2) has a name 330 of "Program Segment C." The start time 340, duration 350, and stop time 360 of program segment 310(2) are shown as TBD because the values are unknown. Commercial pod 320(2) has a name 330 of "Commercial Pod 3." Only the duration 350 of commercial pod 320(2) is known in advance. Consequently, the duration 350 of commercial pod 320(2) is shown as 00:02:00.00 (2 minutes), while the start time 330 and the stop time 360 are TBD.

Although only three program segments 310(0)-310(2) and three commercial pods 320(0)-320(2) are shown in FIG. 3, automation list 300 may include any number of program segments 310 and commercial pods 320. Further, in some embodiments, automation list 300 may include start times 340, durations 350, and stop times 360 for each commercial within each of commercial pods 320(0)-320(2). In addition, in some embodiments, automation list 300 may include start times 340, durations 350, and/or stop times 360 for other live program elements, including, without limitation, billboards, promotional graphics, and identity graphics.

FIG. 4 illustrates exemplar integration messages 400 that can be generated by the integrated control system 106 of FIG. 1, according to various embodiments of the present invention. As shown in FIG. 4, the integration messages 400 include program segment start times 410(0)-410(2) and commercial pod start times 420(0)-420(2). The integration messages 400 identify the actual start times of the program segments and commercial pods during the live program.

As shown, program segment start time 410(0) has the name 430 "Program Segment A" and a start time of 00:00:00.00, indicating that the corresponding program segment aired at the beginning of the live program. Commercial pod start time 420(0) has the name 430 "Commercial Pod 1" and a start time of 00:13:00.00, indicating that the corresponding commercial pod aired at 13 minutes into the live program.

In similar fashion, program segment start time 410(1) has the name 430 "Program Segment B" and a start time of 00:16:00.00, indicating that the corresponding program segment aired at 16 minutes into the live program. Commercial pod start time 420(1) has the name 430 "Commercial Pod 2" and a start time of 00:33:00.00, indicating that the corresponding commercial pod aired at 33 minutes into the live program. Program segment start time 410(2) has the name 430 "Program Segment C" and a start time of 00:35:00.00, indicating that the corresponding program segment aired at 35 minutes into the live program. Finally, commercial pod start time 420(2) has the name 430 "Commercial Pod 3" and a start time of 00:45:00.00, indicating that the corresponding commercial pod aired at 45 minutes into the live program.

Although only three program segment start times 410(0)-410(2) and three commercial pod start times 420(0)-420(2) are shown in FIG. 4, integration messages 400 may include any number of program segment start times 410 and commercial pod start times 420. Further, in some embodiments, integration messages 400 may include start times 440, as well as durations and/or stop times, for other live program elements, including, without limitation, billboards, promotional graphics, and identity graphics.

Figure 5:
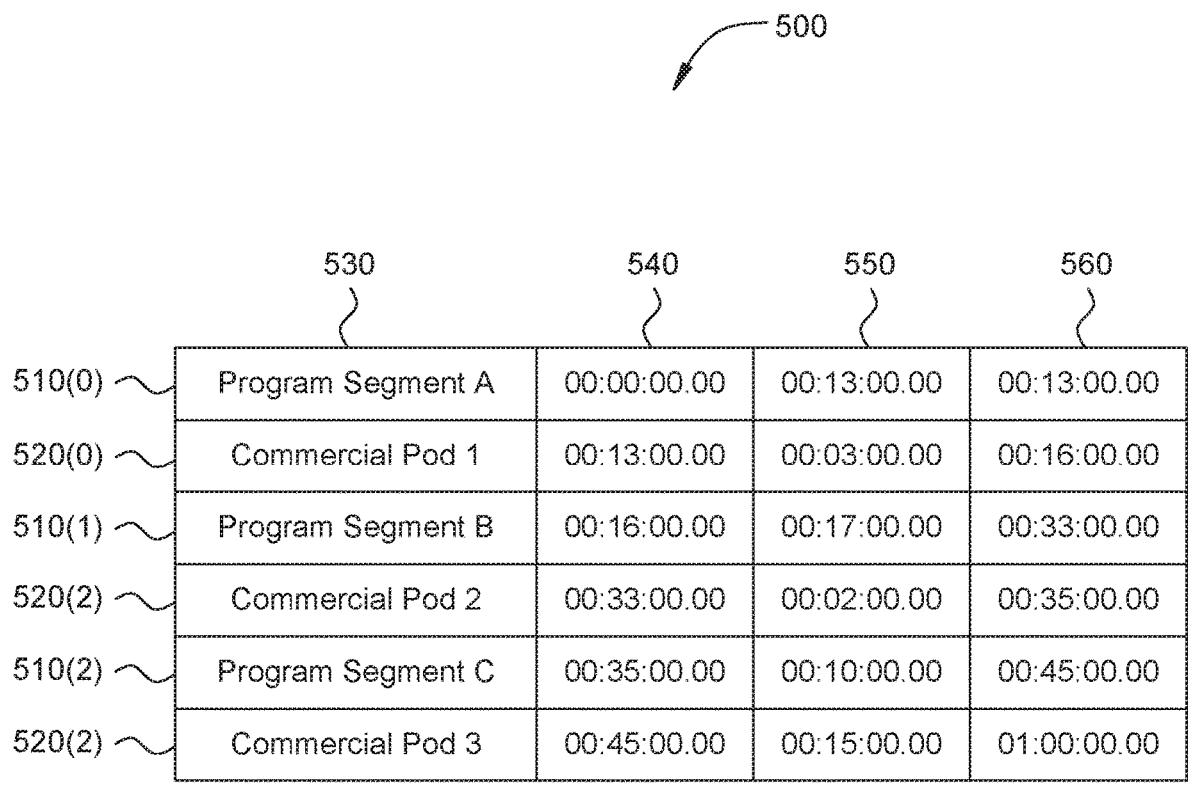
FIG. 5 illustrates an exemplar data record that can be generated by the live program extraction system of FIG. 1, according to various embodiments of the present invention.

FIG. 5 illustrates an exemplar data record 500 that can be generated by the live program extraction system 108 of FIG. 1, according to various embodiments of the present invention. As shown in FIG. 5, the data record 500 includes program segments 510(0)-510(2) and commercial pods 520(0)-520(2). Data record 500 is a combination of the information from automation list 300 prepared prior to the live program and integration messages 400 received during the live program. As a result, the names 530, start times 540, durations 550, and stop times 560 are known for all program segments 510(0)-510(2) and commercial pods 520(0)-520(2). Therefore, a DAI system or other automation system could generate a frame-accurate subsequent airing of the previously-recorded live program, including programs segment and commercial pod substitutions, based on the information included in data record 500.

Although only three program segments 510(0)-510(2) and three commercial pods 520(0)-520(2) are shown in FIG. 5, data record 500 may include any number of program segments 510 and commercial pods 520. Further, in some embodiments, data record 500 may include start times 540, durations 550, and/or stop times 560 for other live program elements, including, without limitation, billboards, promotional graphics, and identity graphics.

Figure 6:
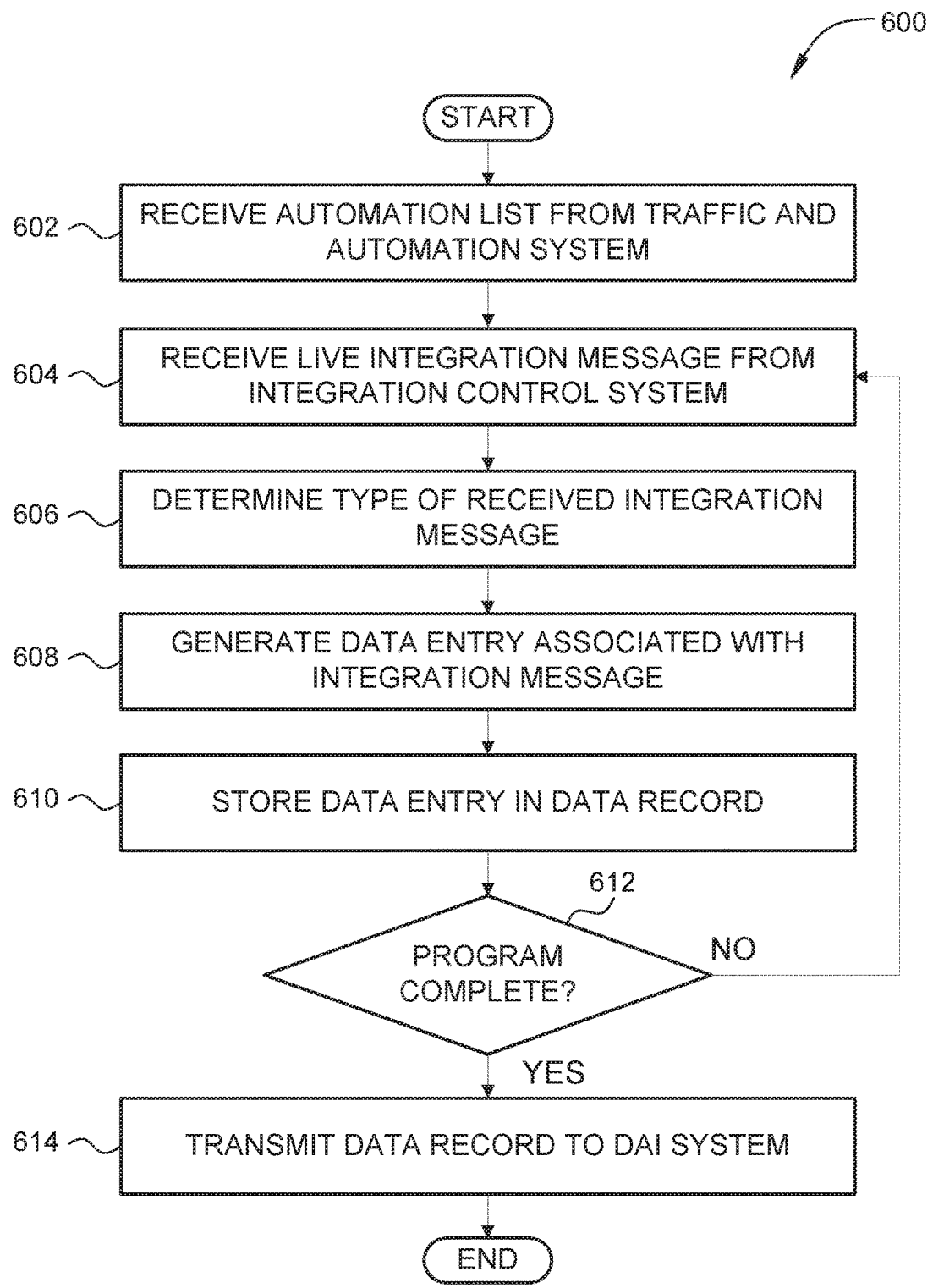
FIG. 6 is a flow diagram of method steps for automatically generating data records associated with a live video production, according to various embodiments of the present invention.

FIG. 6 is a flow diagram of method steps for automatically generating data records associated with a live video production, according to various embodiments of the present invention. Although the method steps are described in conjunction with the systems of FIGS. 1-5, persons of ordinary skill in the art will understand that any system configured to perform the method steps, in any order, is within the scope of the present invention.

As shown, a method 600 begins at step 602, where a live program extraction application 232 executing on a live program extraction system 108 receives an automation list associated with a live video program from traffic and automation system 102. The automation list identifies a sequence of program segments and commercial pods to be aired during the live program, along with auxiliary program elements, including, without limitation, billboards, promotional graphics, and identity graphics.

At step 604, live program extraction application 232 receives a live integration message associated with the live video program from integration control system 104. The live integration message may be in any technically feasible format, including, without limitation, general purpose interface (GPI) switch closures, messages embedded within a video signal or other communications signal, and messages sent over communications network 120. In some embodiments, the messages embedded within a video signal and/or the messages sent over communications network 120 may conform to the Society of Cable and Television Engineers (SCTE) messaging standard At step 606, live program extraction application 232 determines the type of the received integration message. For example, live program extraction application 232 could determine whether the integration message indicates the start of a new program segment or a start of a new commercial pod. Further, live program extraction application 232 could determine whether the integration message indicates that a billboard, promotional graphic, or identity graphic has been sent to air or removed from air.

At step 608, live program extraction application 232 generates one or more data entries associated with the integration message. The data entry is based on one or more of the automation list and the integration message. In one example, if the integration message indicates the start of a new program segment, live program extraction application 232 could generate a data entry for the new program segment that includes the start time for the new program segment. In addition, a new program segment indicates the end of the prior commercial pod. Therefore, live program extraction application 232 could further generate a data entry that includes the duration and the stop time for the commercial pod. Live program extraction application 232 calculates the duration is based on the difference between the timecode for the start of the new program segment and the start time of the prior commercial pod.

In another example, if the integration message indicates the start of a new commercial pod, live program extraction application 232 could generate a data entry for the new commercial pod that includes the start time for the new commercial pod. In addition, a new program segment indicates the end of the prior program segment. Therefore, live program extraction application 232 could further generate a data entry that includes the duration and the stop time for the program segment. Live program extraction application 232 calculates the duration is based on the difference between the timecode for the start of the new commercial pod and the start time of the prior program segment.

In yet another example, if the integration message indicates that a graphic is now being aired, live program extraction application 232 could generate a data entry for the new commercial pod that includes the start time, duration, and/or stop time for the graphic. The graphic could include any type of graphic, including, without limitation, a billboard, a promotional graphic, an identity graphic, and any other technically feasible graphic or non-graphic program element, in any technically feasible combination.

Live program extraction application 232 also generates appropriate data entries for other integration messages corresponding to other auxiliary program elements, including, without limitation, billboards, promotional graphics, and identity graphics.

At step 610, live program extraction application 232 stores the data entries into a data record based on one or more of the automation list and the integration message. At step 612, live program extraction application 232 determines whether the live program is complete. If the live program is not complete, then the method 600 proceeds to step 604, described above. If, however, the live program is complete, then the method 600 proceeds to step 614, where live program extraction application 232 transmits the data record to a DAI system. As further described herein, the DAI system automatically frame-accurately replaces a portion of the recorded version of the live video program based on the timecodes included in the data entries of the data record.

The method 600 then terminates.

In some embodiments, a live program may be divided into multiple sections, as further described herein. In such embodiments, steps 604 through 612, inclusive, are repeated for each section until the live program is complete. Then the method 600 proceeds to step 614, described above. In this manner, the DAI system automatically replaces portions of one section of the live program as that section is subsequently aired. Concurrently, live program extraction application 232 generates data entries for a data record associated with another section of the live program.

Figure 7A:
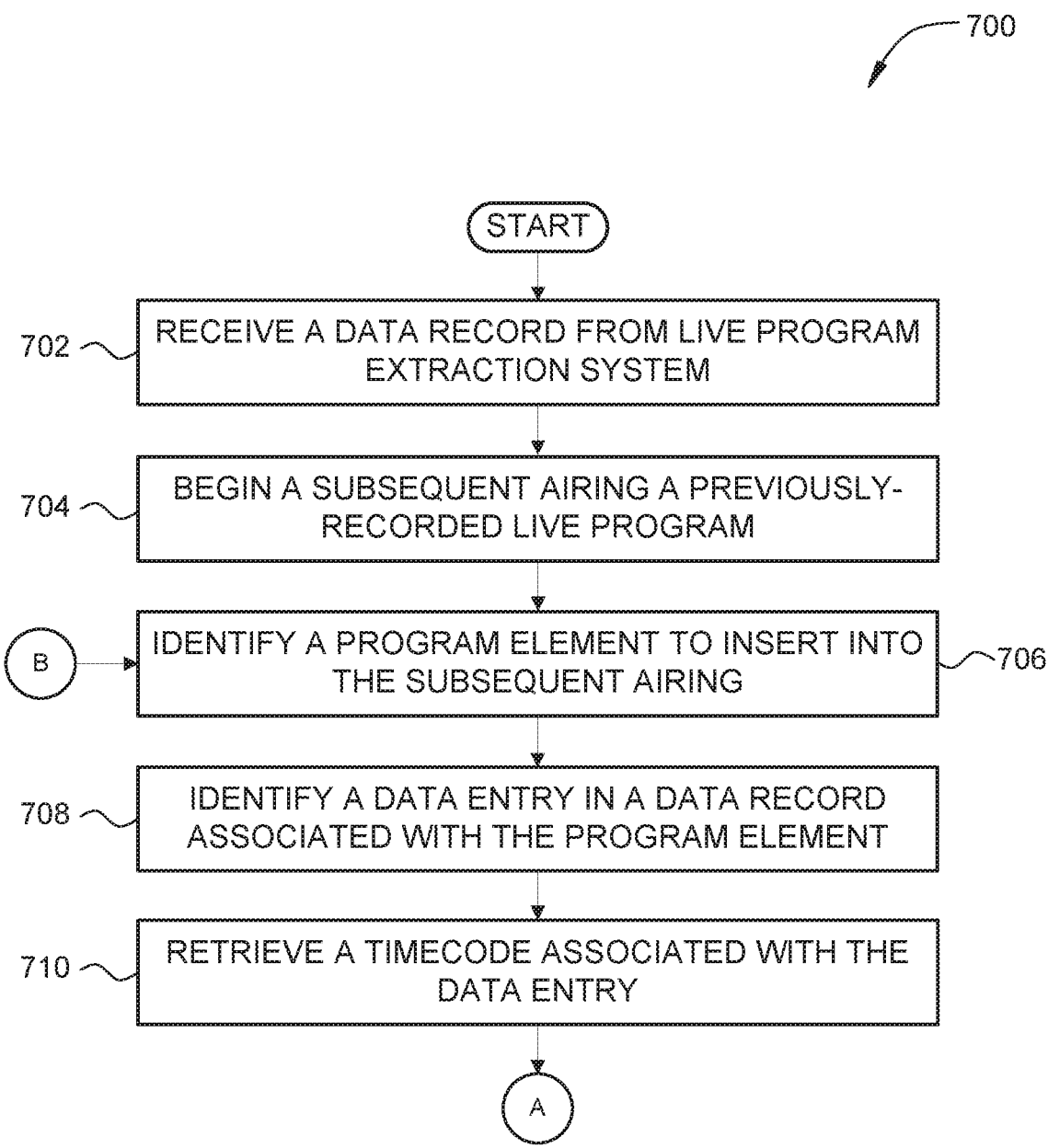
FIGS. 7A-7B set forth a flow diagram of method steps for replacing portions of a recorded version of the live program for subsequent airing, according to various embodiments of the present invention.
Figure 7B:
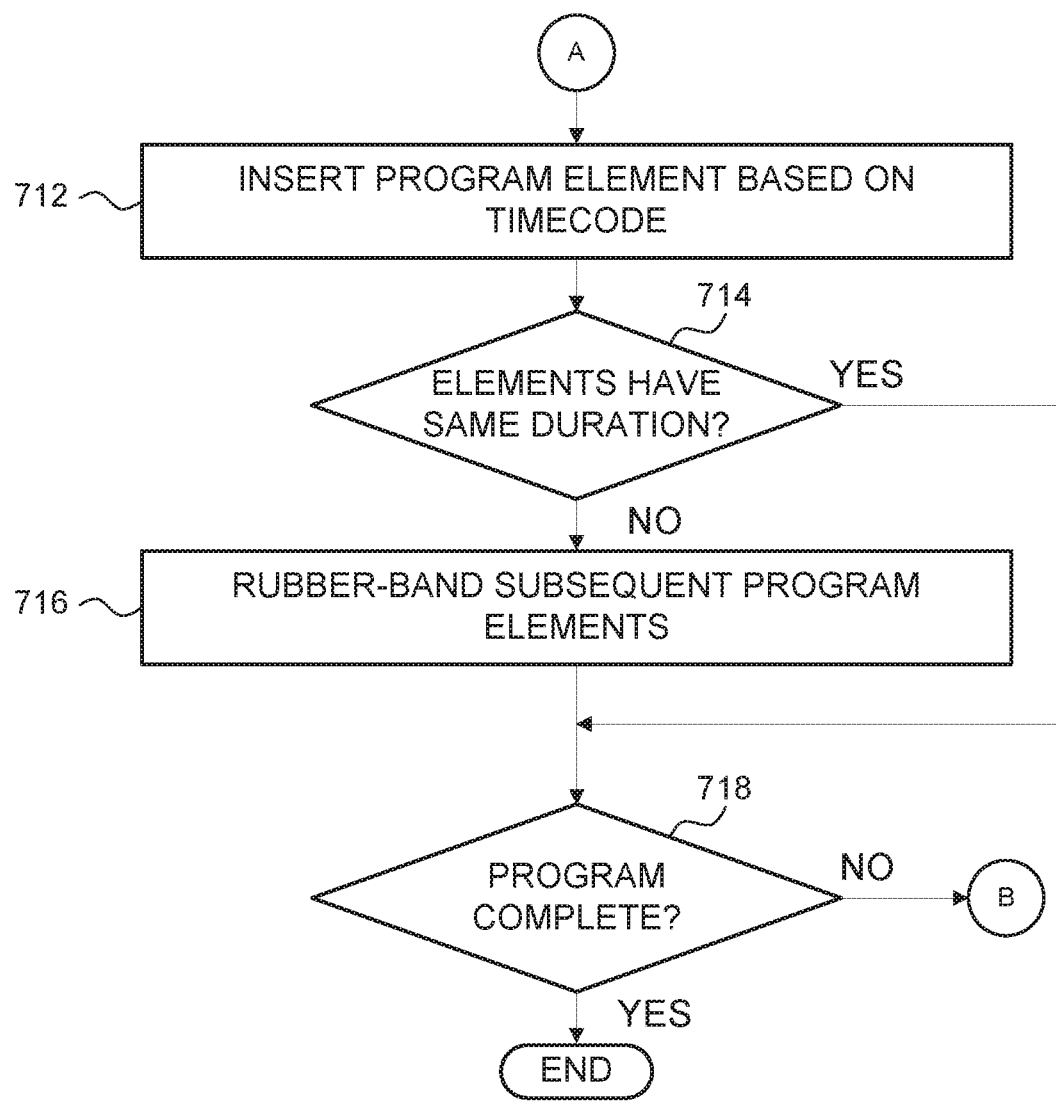

FIGS. 7A-7B set forth a flow diagram of method steps for replacing portions of a recorded version of the live program for subsequent airing, according to various embodiments of the present invention. Although the method steps are described in conjunction with the systems of FIGS. 1-5, persons of ordinary skill in the art will understand that any system configured to perform the method steps, in any order, is within the scope of the present invention.

As shown, a method 700 begins at step 702, where a DAI system receives, a live program extraction application 232 executing on a live program extraction system 108, a data record associated with a previously-record live program. The data record may be in any technically feasible format, including, without limitation, metadata, an XML script, an automation list, a database, a relational database, a spreadsheet, a CSV file, and a simple text file. At step 704, the DAI system begins a subsequent airing of the previously-recorded live program. At step 706, the DAI system identifies a program element to insert into the subsequent airing of the live program as a replacement for a corresponding program element that was aired during original airing of the live program. The program element may be any technically feasible program element of a live program, including, without limitation, a commercial pod, a program segment, a billboard, a promotional graphic, and an identity graphic. Additionally or alternatively, the program element may be any one or more individual interstitial content items within a commercial pod, including, without limitation, individual commercials, promotional videos, and public service announcements, in any technically feasible combination.

At step 708, the DAI system identifies a data entry in the data record associated with the program element that is to be replaced. At step 710, the DAI system retrieves a timecode associated with the data entry in the data record. At step 712, the DAI system inserts the replacement record into the subsequent airing of the live program. More specifically, the DAI system switches from airing the previously-recorded live program to airing the replacement program element. More specifically, the DAI system frame-accurately switches from airing the previously-recorded live program to airing the replacement program element based on the retrieved timecode. At the termination of the replacement program element, the DAI system frame-accurately switches from airing the replacement program element to airing the previously-recorded live program based on the duration of the replacement program element.

At step 712, the DAI system determines whether the replacement program element has the same duration as the corresponding program element in the originally aired live program that has been replaced. If the replacement program element does not have the same duration as the corresponding original program element, then the method 700 proceeds to step 716, where the DAI system rubber-bands the remaining program elements in the airing of the previously recorded live program. If the replacement program element is shorter than the corresponding original program element, then the DAI system subtracts the difference between the durations from the start times and stop times for subsequent program elements. If, on the other hand, the replacement program element is longer than the corresponding original program element, then the DAI system adds the difference between the durations to the start times and stop times for subsequent program elements. The method 700 then proceeds to step 718, described below.

If, at step 712, the replacement program element has the same duration as the corresponding original program element, then the method 700 proceeds to step 718, where the DAI system determines whether the airing of the previously-recorded live program is complete. If the airing of the live program is not complete, then the method 700 proceeds to step 704, described above. If, however, the live program is complete, then the method 700 terminates.

In some embodiments, a live program may be divided into multiple sections, as further described herein. In such embodiments, steps 702 through 716, inclusive, are repeated for each section until the live program is complete.

In sum, a live program extraction system automatically generates a data record that includes frame-accurate records of the start times, durations, and stop times for each program segment and commercial pod as a live program is being aired. The live program extraction system combines information from an automation list for the live program along with program segment and commercial pod start/stop triggers that are inserted as the live program occurs. From the automation list and the start/stop triggers, the live program extraction system generates the frame-accurate data record. The data record is stored in any technically feasible format, including, without limitation, metadata, an XML script, an automation list, a database, a relational database, a spreadsheet, a CSV file, and a simple text file. The frame-accurate data record is the available for use in subsequent airings of the previously-recorded live program.

At least one technical advantage of the disclosed techniques relative to the prior art is that a frame-accurate data record of the start times, durations, and stop times for program segments and commercial pods are recorded concurrently while a live program is aired. Consequently, the data record is available immediately after a live program completes, which allows a DAI system to receive the data record and automatically make frame-accurate substitutions of commercial advertisements in a recorded version of the live program for subsequent airing. As a result, the likelihood of causing up-cuts in subsequent airings of the live program can be substantially reduced relative to prior approaches, thereby improving the overall user experience. Another technical advantage of the disclosed techniques is that manual processes for replacing program segments and commercial pods, after the live program or a section of the live program is complete, are avoided. As a result, latency between the original and subsequent airings of a live program is reduced. Further, additional costs associated with manual editing and post-production are reduced or eliminated. These technical advantages represent one or more technological improvements over prior art approaches.

1. In some embodiments, a computer-implemented method for automatically generating a recorded version of a live video program comprises: receiving an automation list associated with the live video program from a traffic and automation system; receiving a first integration message associated with the live video program from an integration control system; generating a first data entry that includes a timecode based on at least one of the automation list and the first integration message; storing the first data entry into a data record associated with the live video program; and transmitting the data record to a broadcast system, wherein the broadcast system automatically replaces a portion of the recorded version of the live video program based on the timecode included in the first data entry.

2. The computer-implemented method according to clause 1, wherein the broadcast system automatically replaces the portion of the recorded version of the live video program prior to when the live video program ends.

3. The computer-implemented method according to clause 1 or clause 2, further comprising determining that the timecode identifies a start time of a first program segment, and wherein generating the first data entry comprises: determining that the first data entry is associated with a program segment; and setting a start time associated with the first data entry to the timecode.

4. The computer-implemented method according to any of clauses 1-3, further comprising determining that the timecode identifies a start time of a first program segment, and wherein generating the first data entry comprises: determining that a second data entry is associated with a commercial pod that was playing when the first integration message was received; and setting a stop time associated with the second data entry to the timecode.

5. The computer-implemented method according to any of clauses 1-4, further comprising determining that the timecode identifies a start time of a first program segment, and wherein generating the first data entry comprises: identifying that a second data entry is associated with a commercial pod that was playing when the first integration message was received; calculating a difference value between the timecode and a start time associated with the second data entry; and setting a duration associated with the second data entry to the difference value.

6. The computer-implemented method according to any of clauses 1-5, wherein the first integration message is compliant with the Society of Cable and Television Engineers (SCTE) messaging standard.

7. The computer-implemented method according to any of clauses 1-6, wherein the first integration message comprises a general purpose interface (GPI) switch closure.

8. The computer-implemented method according to any of clauses 1-7, further comprising: receiving a second integration message associated with the live video program from the integration control system indicating that a graphic is being aired; generating a second data entry that includes a timecode based on the second integration message; and storing the second data entry into the data record associated with the live video program.

9. The computer-implemented method according to any of clauses 1-8, wherein the graphic includes at least one of a billboard, a promotional graphic, and an identity graphic.

10. In some embodiments, a non-transitory computer-readable storage medium includes instructions that, when executed by a processor, cause the processor to perform the steps of: receiving an automation list associated with the live video program from a traffic and automation system; receiving an integration message associated with the live video program from an integration control system; generating a first data entry that includes a timecode based on at least one of the automation list and the integration message; storing the first data entry into a data record associated with the live video program; and transmitting the data record to a broadcast system, wherein the broadcast system automatically replaces a portion of the recorded version of the live video program based on the timecode included in the first data entry.

11. The non-transitory computer-readable storage medium according to clause 10, further comprising determining that the timecode identifies a start time of a first program segment, and wherein generating the first data entry comprises: determining that the first data entry is associated with a program segment; and setting a start time associated with the first data entry to the timecode.

12. The non-transitory computer-readable storage medium according to clause 10 or clause 11, further comprising determining that the timecode identifies a start time of a first program segment, and wherein generating the first data entry comprises: determining that a second data entry is associated with a commercial pod that was playing when the integration message was received; and setting a stop time associated with the second data entry to the timecode.

13. The non-transitory computer-readable storage medium according to any of clauses 10-12, further comprising determining that the timecode identifies a start time of a first program segment, and wherein generating the first data entry comprises: identifying that a second data entry is associated with a commercial pod that was playing when the integration message was received; calculating a difference value between the timecode and a start time associated with the second data entry; and setting a duration associated with the second data entry to the difference value.

14. The non-transitory computer-readable storage medium according to any of clauses 10-13, further comprising determining that the timecode identifies a start time of a first commercial pod, and wherein generating the first data entry comprises: determining that the first data entry is associated with a commercial pod; and setting a start time associated with the first data entry to the timecode.

15. The non-transitory computer-readable storage medium according to any of clauses 10-14, further comprising determining that the timecode identifies a start time of a first commercial pod, and wherein generating the first data entry comprises: determining that a second data entry is associated with a first program segment that was playing when the integration message was received; and setting a stop time associated with the second data entry to the timecode.

16. The non-transitory computer-readable storage medium according to any of clauses 10-15, further comprising determining that the timecode identifies a start time of a first commercial pod, and wherein generating the first data entry comprises: identifying that a second data entry is associated with a first program segment that was playing when the integration message was received; calculating a difference value between the timecode and a start time associated with the second data entry; and setting a duration associated with the second data entry to the difference value.

17. In some embodiments, a computing device comprises: a memory that includes instructions; and a processor that is coupled to the memory and, when executing the instructions, is configured to: receive an automation list associated with the live video program from a and automation traffic system; receive an integration message associated with the live video program from an integration control system; generate a first data entry that includes a timecode based on at least one of the automation list and the integration message; store the first data entry into a data record associated with the live video program; and transmit the data record to a broadcast system, wherein the broadcast system automatically replaces a portion of the recorded version of the live video program based on the timecode included in the first data entry.

18. The computing device according to clause 17, wherein the broadcast system automatically replaces the portion of the recorded version of the live video program prior to when the live video program ends.

19. The computing device method according to clause 17 or clause 18, wherein the integration message is compliant with the Society of Cable and Television Engineers (SCTE) messaging standard.

20. The computing device according to any of clauses 17-19, wherein the integration message comprises a general purpose interface (GPI) switch closure.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for automatically generating a recorded version of a live video program, the method comprising:
   receiving an automation list associated with the live video program that includes a plurality of portions, wherein the automation list includes a scheduled start time associated with a first portion included in the plurality of portions;
   receiving a first integration message associated with the first portion, wherein the first integration message indicates a broadcast start time associated with the first portion;
   generating a first data entry that includes a first timecode associated with the first portion based on at least one of the scheduled start time or the broadcast start time wherein the first timecode indicates a start time different than the at least one of the scheduled start time or the broadcast start time; and
   storing the first data entry into a data record associated with the live video program, wherein the data record is populated in real-time as the live video program is broadcast and, at a conclusion of the broadcast, includes a different timecode for each portion of the plurality of portions, wherein, subsequent to the first portion being re-broadcast, content included in the first portion of the live video program is replaced with different content based on the first timecode included in the first data entry.

2. The computer-implemented method of claim 1, wherein content included in the first portion of the live video program is replaced with the different content prior to when the live video program ends.

3. The computer-implemented method of claim 1, wherein the start time is associated with a first program segment corresponding to the first portion, and wherein generating the first data entry comprises:
   determining that the first data entry is associated with the first program segment; and
   setting an entry start time associated with the first data entry to the first timecode.

4. The computer-implemented method of claim 1, wherein the start time is associated with a first program segment corresponding to the first portion, and wherein generating the first data entry comprises:
   determining that a second data entry is associated with a commercial pod that was playing when the first integration message was received; and
   setting an entry stop time associated with the second data entry to the first timecode.

5. The computer-implemented method of claim 1, wherein the start time is associated with a first program segment corresponding to the first portion, and wherein generating the first data entry comprises:
   identifying that a second data entry is associated with a commercial pod that was playing when the first integration message was received;
   calculating a difference value between the first timecode and a start time associated with the second data entry; and
   setting a duration associated with the second data entry to the difference value.

6. The computer-implemented method of claim 1, wherein the first integration message is compliant with the Society of Cable and Television Engineers (SCTE) messaging standard.

7. The computer-implemented method of claim 1, wherein the first integration message comprises a general purpose interface (GPI) switch closure.

8. The computer-implemented method of claim 1, further comprising:
   receiving a second integration message associated with a second portion of the live video program indicating that a graphic is being aired;
   generating a second data entry that includes a timecode based on the second integration message; and
   storing the second data entry into the data record associated with the live video program.

9. The computer-implemented method of claim 8, wherein the graphic includes at least one of a billboard, a promotional graphic, or an identity graphic.

10. A non-transitory computer-readable storage medium including instructions that, when executed by a processor, cause the processor to perform the steps of:
    receiving an automation list associated with a live video program that includes a plurality of portions, wherein the automation list includes a scheduled start time associated with a first portion included in the plurality of portions;

receiving a first integration message associated with the first portion, wherein the first integration message indicates a broadcast start time associated with the first portion;

generating a first data entry that includes a first timecode associated with the first portion based on at least one of the scheduled start time or the broadcast start time wherein the first timecode indicates a start time different than the at least one of the scheduled start time or the broadcast start time; and storing the first data entry into a data record associated with the live video program, wherein the data record is populated in real-time as the live video program is broadcast and, at a conclusion of the broadcast, includes a different timecode for each portion of the plurality of portions, wherein, subsequent to the first portion being re-broadcast, content included in the first portion of the live video program is replaced with different content based on the first timecode included in the first data entry.

11. The non-transitory computer-readable storage medium of claim 10, wherein the start time is associated with a first program segment corresponding to the first portion, and wherein generating the first data entry comprises:

determining that the first data entry is associated with the first program segment; and setting an entry start time associated with the first data entry to the first timecode.

12. The non-transitory computer-readable storage medium of claim 10, wherein the start time is associated with a first program segment corresponding to the first portion, and wherein generating the first data entry comprises:

determining that a second data entry is associated with a commercial pod that was playing when the first integration message was received; and setting an entry stop time associated with the second data entry to the first timecode.

13. The non-transitory computer-readable storage medium of claim 10, wherein the start time is associated with a first program segment corresponding to the first portion, and wherein generating the first data entry comprises:

identifying that a second data entry is associated with a commercial pod that was playing when the first integration message was received;

calculating a difference value between the first timecode and a start time associated with the second data entry; and setting a duration associated with the second data entry to the difference value.

14. The non-transitory computer-readable storage medium of claim 10, wherein the start time is associated with a first commercial corresponding to the first portion, and wherein generating the first data entry comprises:

determining that the first data entry is associated with a commercial pod; and setting a start time associated with the first data entry to the first timecode.

15. The non-transitory computer-readable storage medium of claim 10, wherein the start time is associated with a first commercial corresponding to the first portion, and wherein generating the first data entry comprises:

determining that a second data entry is associated with a first program segment that was playing when the first integration message was received; and setting a stop time associated with the second data entry to the first timecode.

16. The non-transitory computer-readable storage medium of claim 10, wherein the start time is associated with a first commercial corresponding to the first portion, and wherein generating the first data entry comprises:

identifying that a second data entry is associated with a first program segment that was playing when the first integration message was received;

calculating a difference value between the first timecode and a start time associated with the second data entry; and setting a duration associated with the second data entry to the difference value.

17. A computing device, comprising:

a memory that includes instructions; and a processor that is coupled to the memory and, when executing the instructions, is configured to:

receive an automation list associated with a live video program that includes a plurality of portions, wherein the automation list includes a scheduled start time associated with a first portion included in the plurality of portions;

receive a first integration message associated with the first, wherein the first integration message indicates a broadcast start time associated with the first portion;

generate a first data entry that includes a first timecode associated with the first portion based on at least one of the scheduled start time or the broadcast start time, wherein the first timecode indicates a start time different than the at least one of the scheduled start time or the broadcast start time; and store the first data entry into a data record associated with the live video program, wherein the data record is populated in real-time as the live video program is broadcast and, at a conclusion of the broadcast, includes a different timecode for each portion of the plurality of portions, wherein, subsequent to the first portion being re-broadcast, content included in the first portion of the live video program is replaced with different content based on the first timecode included in the first data entry.

18. The computing device of claim 17, wherein content included in the first portion of the live video program is replaced with the different content prior to when the live video program ends.

19. The computing device of claim 17, wherein the first integration message is compliant with the Society of Cable and Television Engineers (SCTE) messaging standard.

20. The computing device of claim 17, wherein the first integration message comprises a general purpose interface (GPI) switch closure.

* * * * *

UNITED STATES PATENT AND TRADEMARK OFFICE
CERTIFICATE OF CORRECTION

PATENT NO. : 10,812,839 B2
APPLICATION NO. : 16/179804
DATED : October 20, 2020
INVENTOR(S) : Vladislav Feldman, Joseph Kenny and Michael Strein Page 1 of 1

It is certified that error appears in the above-identified patent and that said Letters Patent is hereby corrected as shown below:

In the Claims

Column 22, Claim 17, Line 33, please delete "first," and insert --first portion,--.

Signed and Sealed this
Twenty-second Day of December, 2020

Andrei Iancu
*Director of the United States Patent and Trademark Office*